Patented Aug. 1, 1933

1,920,639

UNITED STATES PATENT OFFICE 1,920,639

COMPOSITION OF MATTER FOR USE IN TREATMENT OF DISEASES OF THE SKIN

Olaf Haraldson, Minot, N. Dak.

No Drawing. Application July 8, 1930
Serial No. 466,578

3 Claims. (Cl. 167—63)

The invention relates to a composition of matter especially adapted for use in the treatment of diseases of the skin, and more particularly to a paste or jelly, colloidal in its nature, which contains uncombined formaldehyde, the jelly being applied to the affected part and the formaldehyde liberated by the heat of the body surface.

The principal object of the invention is accordingly to produce an improved formalin composition for the treatment of skin diseases.

According to its preferred embodiment, my invention comprises adding formaldehyde or formalin and glycerine to a water soluble paste or jelly such as starch paste (boiled starch and water) or bentonite, or any other equally suitable semisolid water soluble vehicle, which, when applied to skin or body surface and when subjected to body heat, rapidly dries, liberating formalin gas under conditions permitting it to penetrate the superficial cells of the skin and its appendages and killing the fungi, as well as exercising other beneficial action.

I am aware that solids containing formaldehyde have been previously obtained, but the purpose of incorporating the formaldehyde was either to disinfect the solids themselves or to liberate formalin gas to disinfect atmosphere. I am also aware that porous and absorbent powder (talcum and aluminum oxide) have been previously made to absorb, occlude and retain formalin, so that when this powder in turn absorbs perspiration, the perspiration will be disinfected and deodorized by the contained formalin.

I am also aware that formaldehyde has previously been incorporated in emulsions (fat and water) in liquids and surgical plasters containing agar agar, but none of these processes have involved rapid drying and liberation of formalin gas under such conditions that it will penetrate the superficial cells and kill fungi and exert favorable medicinal action. I am also aware that bentonite has been previously used together with other ingredients to form a lasting moist poultice, but not with formaldehyde. It has long been known that formalin gas is a powerful agent to kill fungi, while a solution or moist suspension of formalin is only mildly fungicidal. The latter principle has never been heretofore applied to the treatment of skin diseases of fungus origin. So far as I am aware, no previous process has been devised in which body heat acting on a compound liberates formalin gas for the treatment of skin diseases. I have discovered that formalin when used by my process is an effective means for treating eczematous diseases of the skin.

The present invention accordingly relates to the incorporation fo formalin or formaldehyde, preferably with glycerine, in a semisolid or semiliquid composition suitable for applying to the skin, hair or nails. By selecting the proper ingredients in their proper proportions, a composition can be obtained which, when applied to the body surface and subjected to body heat, will dry forming a thin gelatinous covering or film, and simultaneously with this drying process formalin gas will be liberated.

Such composition can be made as follows: 30 gm. starch is mixed into 200 cc. cold water and slowly mixed into 300 cc. boiling water over steam bath. When the mixture changes to a semitransparent or opalescent color, I stop the boiling and add to the mixture 10 cc. glycerine and later add from 10 to 50 cc. formalin, and aromatic oils and coloring matter. After thoroughly mixing, the composition may be placed in collapsible tin tubes for sale and use.

Having described one of the preferred methods of preparing the ingredients now known to me, I desire it understood that the process outlined, as well as the ingredients, may be modified in minor or formal detail, such as the substitution of equivalent operations and ingredients, and the variation of the proportions of the ingredients employed. Gum tragacanth, quince seed, acacia, agar agar, bentonite, colloidal clay or equivalents may be employed, together with, or in place of, the starch, without necessarily employing them all.

One of the important features of the present invention consists in preparing the formalin composition of such consistency and physical character that it will exhibit fractional drying when applied to the skin. The drying process of the composition when applied to the skin will be retarded in direct proportion to the amount of glycerine used. A certain balanced proportion of glycerine will produce a composition which, when applied to the skin, will form a thin gelatinous covering. This gelatinous covering exhibits a more rapid drying in its outer zone and forms a retention wall for the formalin. As the deeper zone of this covering dries and liberates its formalin gas, the formalin gas is unable to escape into the air and will accordingly penetrate into the superficial cells of the skin and exert its medicinal action. The method of preparing the formalin composition described in the preceding paragraph exhibits this fractional drying characteristic.

Formalin gas, being an irritant to the skin and sensory nerve endings, produces a burning sensation, varying in intensity according to the concentration of the formalin gas coming in contact with the skin. When 2 percent glycerine is used in the 2 percent formalin composition, a rather marked burning sensation is produced when applied to the skin. When 10 percent glycerine is used in the 2 percent formalin composition, it produces a less marked burning sensation and dries more slowly. When the glycerine is omitted from the 2 percent formalin composition, the drying process occurs more rapidly and by sense of smell one can detect more formalin escaping into the air. The burning sensation felt in the skin is of shorter duration and less intense.

It has previously been known that formalin (formalin gas suspended in water) is a useful germicide and fungicide, and that its most potent action as a fungicide or germicide occurs when the formalin gas is liberated and permitted to act. Seed grain can be dipped in formalin solution and as the water dries, formalin gas is liberated. It has also previously been known that many skin diseases are caused by bacteria, fungi and other parasites. For example, I will mention erysipelas, ringworm, blasto-mycosis, and scabies. Many skin conditions which were formerly diagnosed as eczemas are now known to be caused by fungus infection. The present invention offers a new and useful method of treating such diseases of the skin with formalin gas by merely applying the composition in the form of a salve.

The improved composition may be usefully employed in the treatment of many diseases. Where it is applied to skin in fungus infections, the infected areas will develop into red, inflamed blotches, and this can be used as a specific test for the presence of ringworm. If applied repeatedly the composition will cause the ringworm infection to disappear. If the present formalin composition is applied to moist vesicular itching eczema of the hands, it will relieve the itching almost immediately and dry up and cure the condition. If applied to the area of skin involved in pruritis ani, the formalin composition will cause the symptoms to disappear and will cure the condition. If a composition containing 10 to 20 percent formalin is applied to the ringworm infected area of cattle, it will cure the condition. Where the composition is applied to *Tenia tonsurans* (Kerion) infected skin or scalp, two applications a week apart will usually cure the condition. If the present formalin composition is applied to some of the skin conditions usually diagnosed as toxic dermatitis, dermatitis venenata (poison ivy poisoning), the patient will often experience immediate relief.

It will thus be seen that the present invention provides a new and improved formalin composition and a new and improved method of using formalin gas as a diagnostic test for fungus infection of the skin and also for treating other diseases of the skin and its appendages. A specific embodiment of the invention has been described in detail for the purpose of illustration, but it will be obvious that variations or modifications may be resorted to without departing from the spirit of the invention.

What I claim is:

1. A medicinal salve for the treatment of skin diseases of fungus origin, comprising a paste containing uncombined formaldehyde and a colloidal vehicle which retains the formaldehyde until liberated by the body heat, said vehicle containing a sufficient quantity of glycerine to prevent too rapid drying of the paste until the same is applied to the skin, but insufficient to prevent liberation of formalin gas to the skin when a thin layer of the paste is subjected to body heat.

2. A medicinal salve for the treatment of skin diseases comprising a colloidal paste, composed of the following ingredients in substantially the proportions named: 30 gms. starch, 500 cc. water, 10 cc. glycerine and 10–50 cc. uncombined formalin.

3. A method of producing a medicinal salve for use in the treatment of skin diseases, which consists in mixing 30 gms. of starch in 200 cc. of cold water, then slowly adding the mixture to 300 cc. of boiling water, boiling the mixture until it changes to a semitransparent or opalescent color, then adding 10 cc. of glycerine, subsequently adding 10–50 cc. of formalin, and thoroughly mixing all the ingredients.

OLAF HARALDSON.